(12) United States Patent
Williams

(10) Patent No.: US 10,979,679 B1
(45) Date of Patent: Apr. 13, 2021

(54) VEHICLE ACCIDENT RECORDING SYSTEM

(71) Applicant: Jarvis Williams, Middletown, RI (US)

(72) Inventor: Jarvis Williams, Middletown, RI (US)

( * ) Notice: Subject to any disclaimer, the term of this patent is extended or adjusted under 35 U.S.C. 154(b) by 0 days.

(21) Appl. No.: 16/539,001

(22) Filed: Aug. 13, 2019

(51) Int. Cl.
*H04N 7/00* (2011.01)
*H04N 7/18* (2006.01)
*H04N 5/232* (2006.01)
*B60R 11/04* (2006.01)

(52) U.S. Cl.
CPC .......... *H04N 7/188* (2013.01); *H04N 5/232* (2013.01); *H04N 7/181* (2013.01); *B60R 11/04* (2013.01); *H04N 2201/3253* (2013.01)

(58) Field of Classification Search
CPC ..... B60R 11/04; B60R 1/00; B60R 2011/004; B60R 2300/105; B60R 2300/50; B60K 6/485; B60Q 9/00; G06K 9/00791
USPC ........................................................ 348/118
See application file for complete search history.

(56) References Cited

U.S. PATENT DOCUMENTS

| | | | |
|---|---|---|---|
| 4,843,463 A | 6/1989 | Michetti | |
| 5,027,104 A | 6/1991 | Reid | |
| 5,408,330 A | 4/1995 | Squiccairini | |
| D388,107 S | 12/1997 | Huckins | |
| 6,630,884 B1 | 10/2003 | Shanmugham | |
| 7,180,407 B1 | 2/2007 | Guo | |
| 7,659,827 B2 | 2/2010 | Gunderson | |
| 9,604,639 B2 | 3/2017 | Laur | |
| 2004/0075600 A1* | 4/2004 | Vera | H02J 1/102 341/166 |
| 2007/0257815 A1* | 11/2007 | Gunderson | G08G 1/16 340/903 |
| 2009/0171478 A1* | 7/2009 | Wong | G08G 1/04 700/13 |
| 2010/0277958 A1* | 11/2010 | Campbell | B60K 6/485 363/40 |
| 2011/0304733 A1 | 12/2011 | Umoh | |
| 2015/0134739 A1* | 5/2015 | Gibbon | H04N 5/765 709/204 |
| 2018/0215378 A1 | 8/2018 | Ros | |
| 2019/0213425 A1* | 7/2019 | Anderson | G06Q 40/08 |

FOREIGN PATENT DOCUMENTS

WO 1999062741 12/1999

* cited by examiner

*Primary Examiner* — Masum Billah

(57) ABSTRACT

The vehicle accident recording system is configured for use with a vehicle. The vehicle further comprises a vehicle electric power source. The vehicle accident recording system comprises an acceleration sensor, a plurality of cameras, a control circuit, and a commercially provided and publically available cellular wireless network. The acceleration sensor detects the deceleration event. The plurality of cameras continuously captures video images of the area around the vehicle. The control circuit controls the operation of the vehicle accident recording system. The commercially provided and publically available cellular wireless network provides a communication link between the vehicle accident recording system and the appropriate authority. The vehicle accident recording system is isolated from the vehicle electric power source such that the vehicle accident recording system continues to operate in the event that the vehicle electric power source fails during the unfortunate incident.

17 Claims, 5 Drawing Sheets

US 10,979,679 B1

VEHICLE ACCIDENT RECORDING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of physics including checking-device that register the performance of working of machines, more specifically, a video recorder in combination with one or more video cameras. (G07C5/0891)

SUMMARY OF INVENTION

The vehicle accident recording system is a video recording device. The vehicle accident recording system is configured for use with a vehicle. The vehicle further comprises a vehicle electric power source. The vehicle accident recording system: a) continuously captures video images of the area around the vehicle; b) converts the captured images into a video file; c) monitors the vehicle for a deceleration event that is consistent with an unfortunate incident associated with the vehicle; and, d) in the event that an unfortunate incident is detected, the vehicle accident recording system automatically transmits the video file to an appropriate authority. The vehicle accident recording system is isolated from the vehicle electric power source such that the vehicle accident recording system continues to operate in the event that the vehicle electric power source fails during the unfortunate incident. By continuing to operate is meant that the vehicle accident recording system: a) continues to detect the deceleration event; and b) the vehicle accident recording system automatically continues to transmit the video file to an appropriate authority.

The vehicle accident recording system comprises an acceleration sensor, a plurality of cameras, a control circuit, and a commercially provided and publically available cellular wireless network. The acceleration sensor detects the deceleration event. The plurality of cameras continuously captures video images of the area around the vehicle. The control circuit controls the operation of the vehicle accident recording system. The commercially provided and publically available cellular wireless network provides a communication link between the vehicle accident recording system and the appropriate authority.

These together with additional objects, features and advantages of the vehicle accident recording system will be readily apparent to those of ordinary skill in the art upon reading the following detailed description of the presently preferred, but nonetheless illustrative, embodiments when taken in conjunction with the accompanying drawings.

In this respect, before explaining the current embodiments of the vehicle accident recording system in detail, it is to be understood that the vehicle accident recording system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle accident recording system.

It is therefore important that the claims be regarded as including such equivalent construction insofar as they do not depart from the spirit and scope of the vehicle accident recording system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
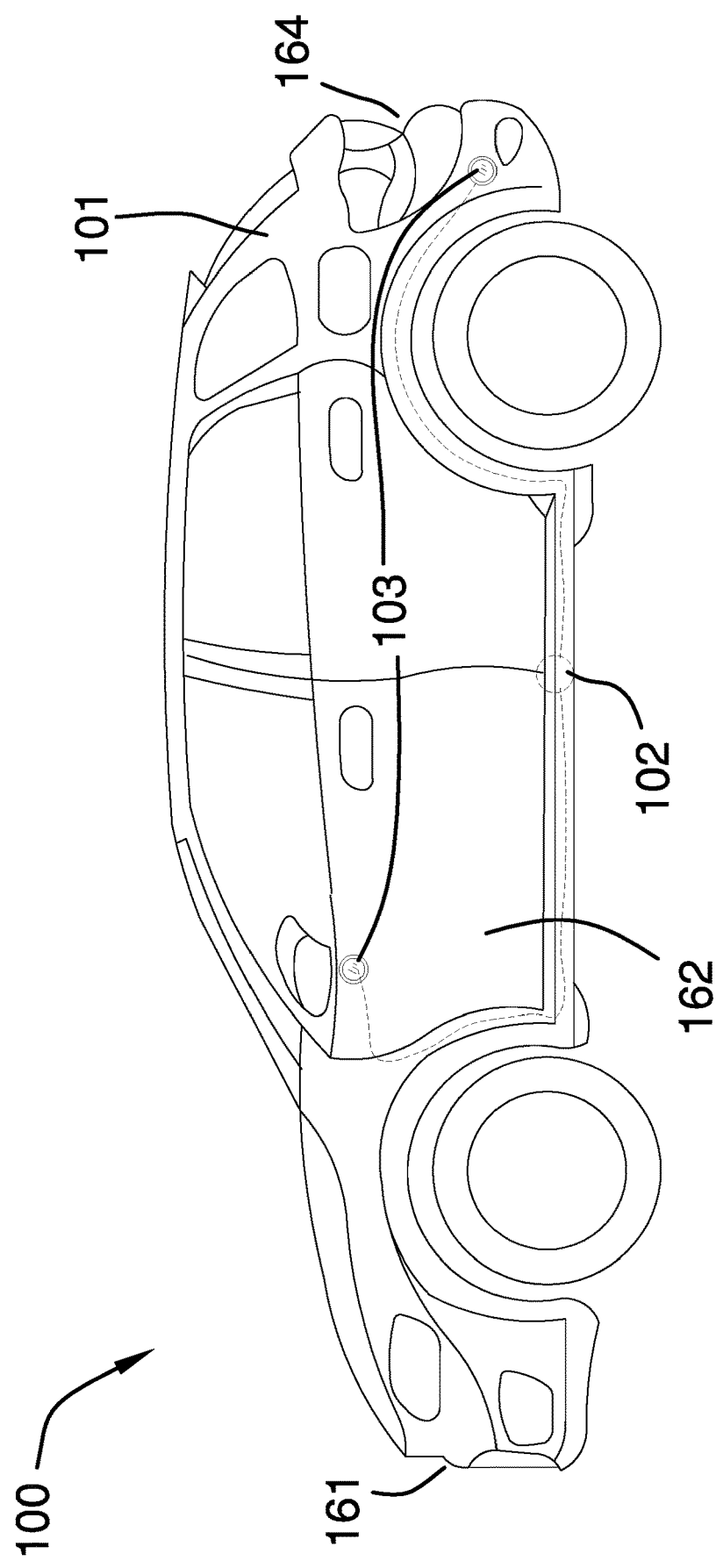
FIG. 1 is a port side view of an embodiment of the disclosure.
Figure 2:
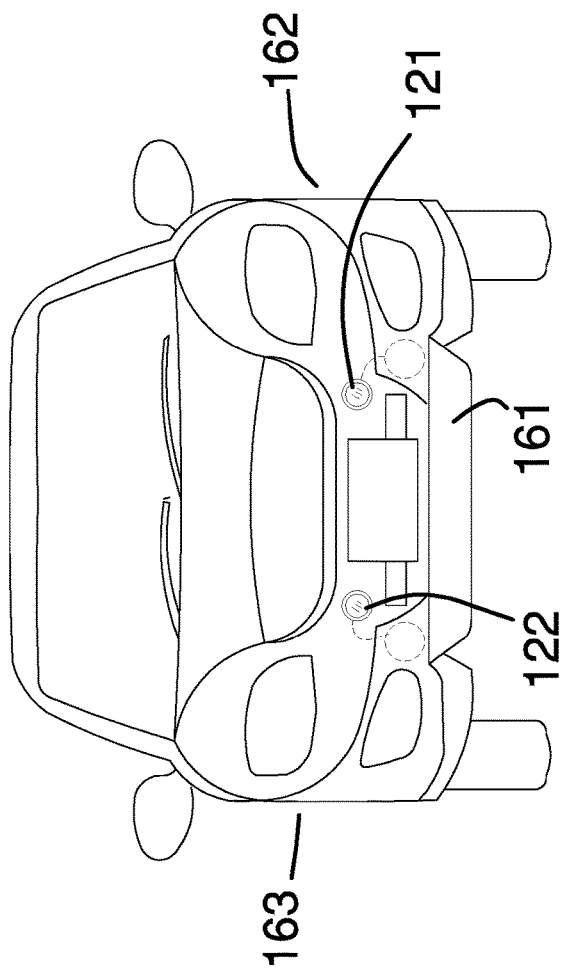
FIG. 2 is a forward view of an embodiment of the disclosure.
Figure 3:
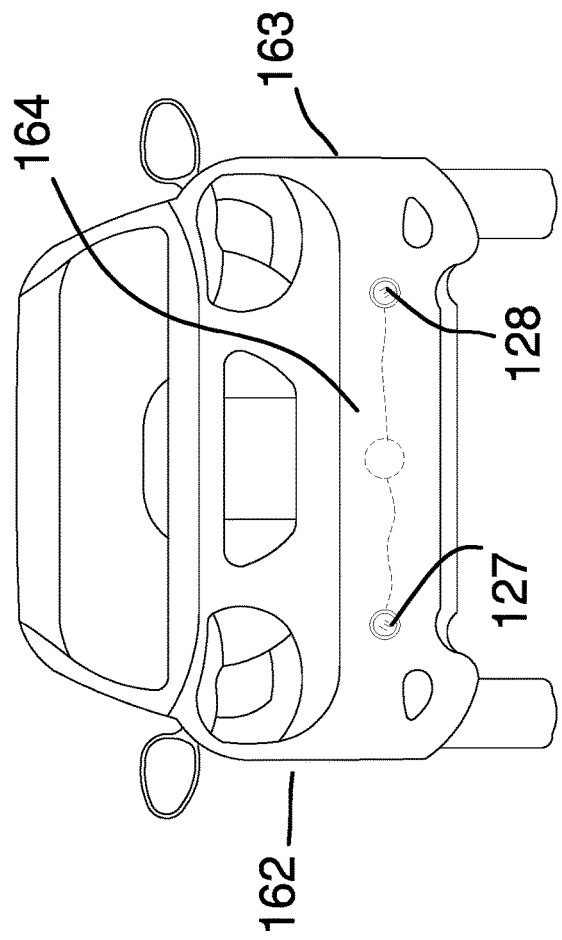
FIG. 3 is an aft view of an embodiment of the disclosure.
Figure 4:
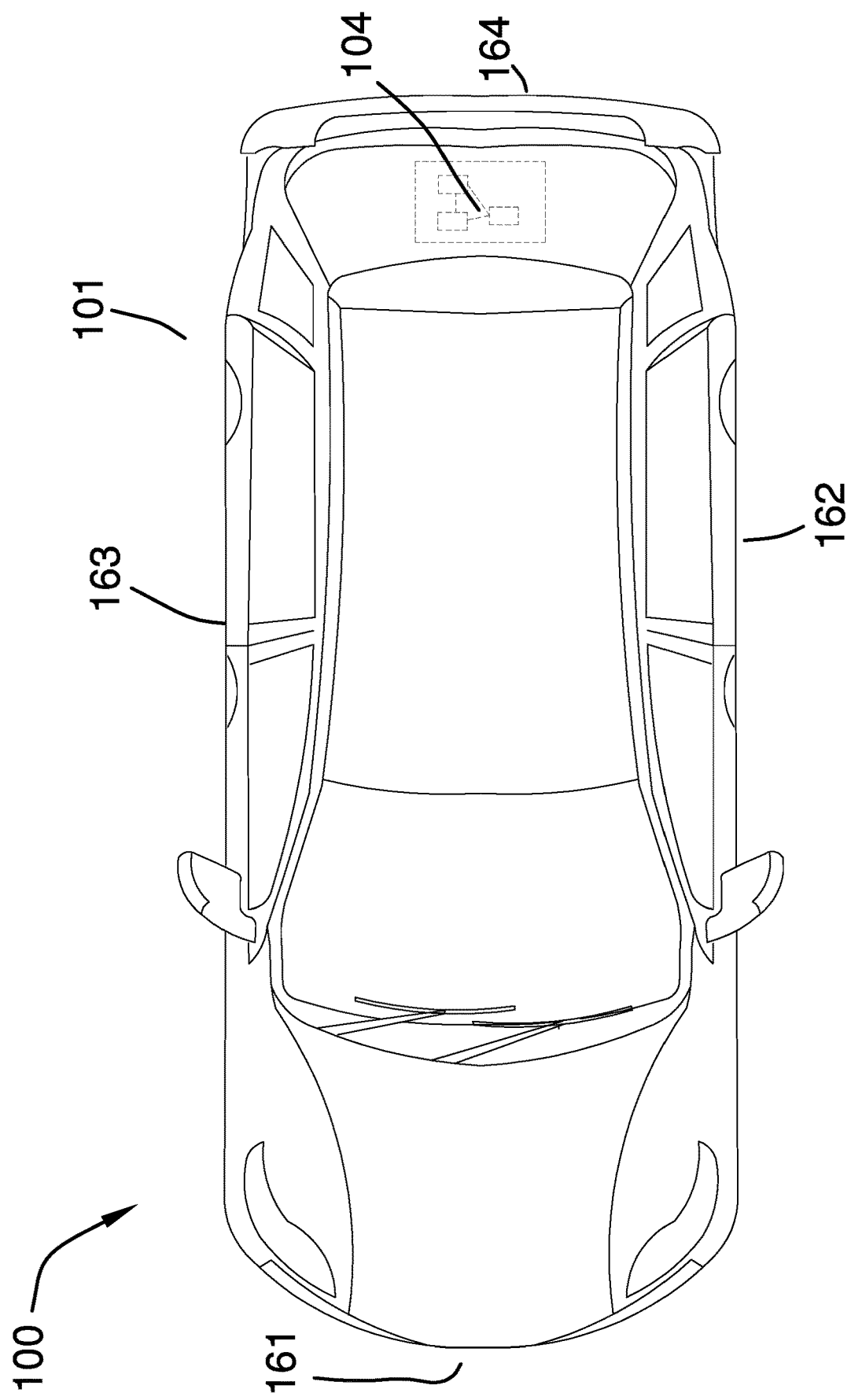
FIG. 4 is a top view of an embodiment of the disclosure.
Figure 5:
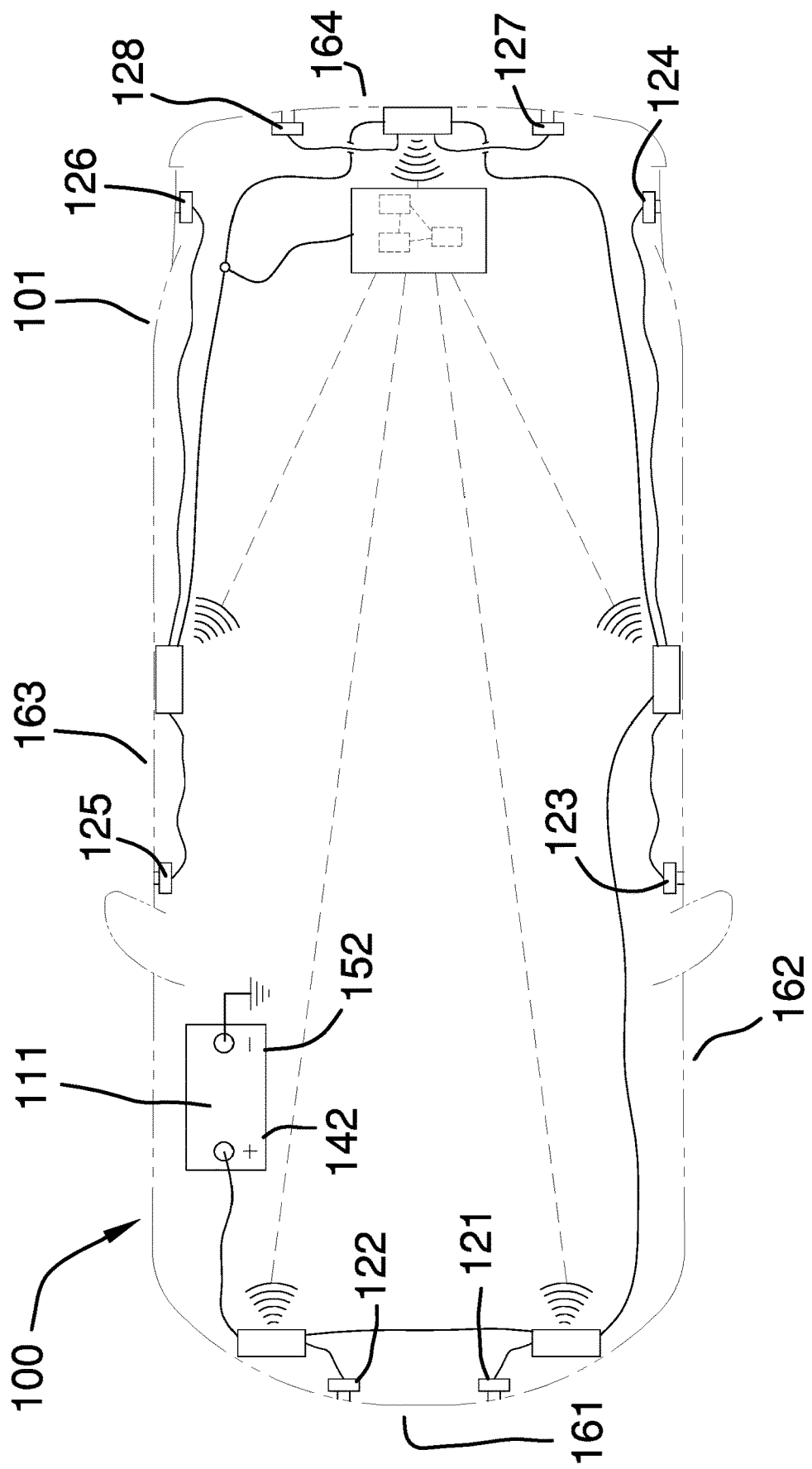
FIG. 5 is a detail view of an embodiment of the disclosure.
Figure 6:
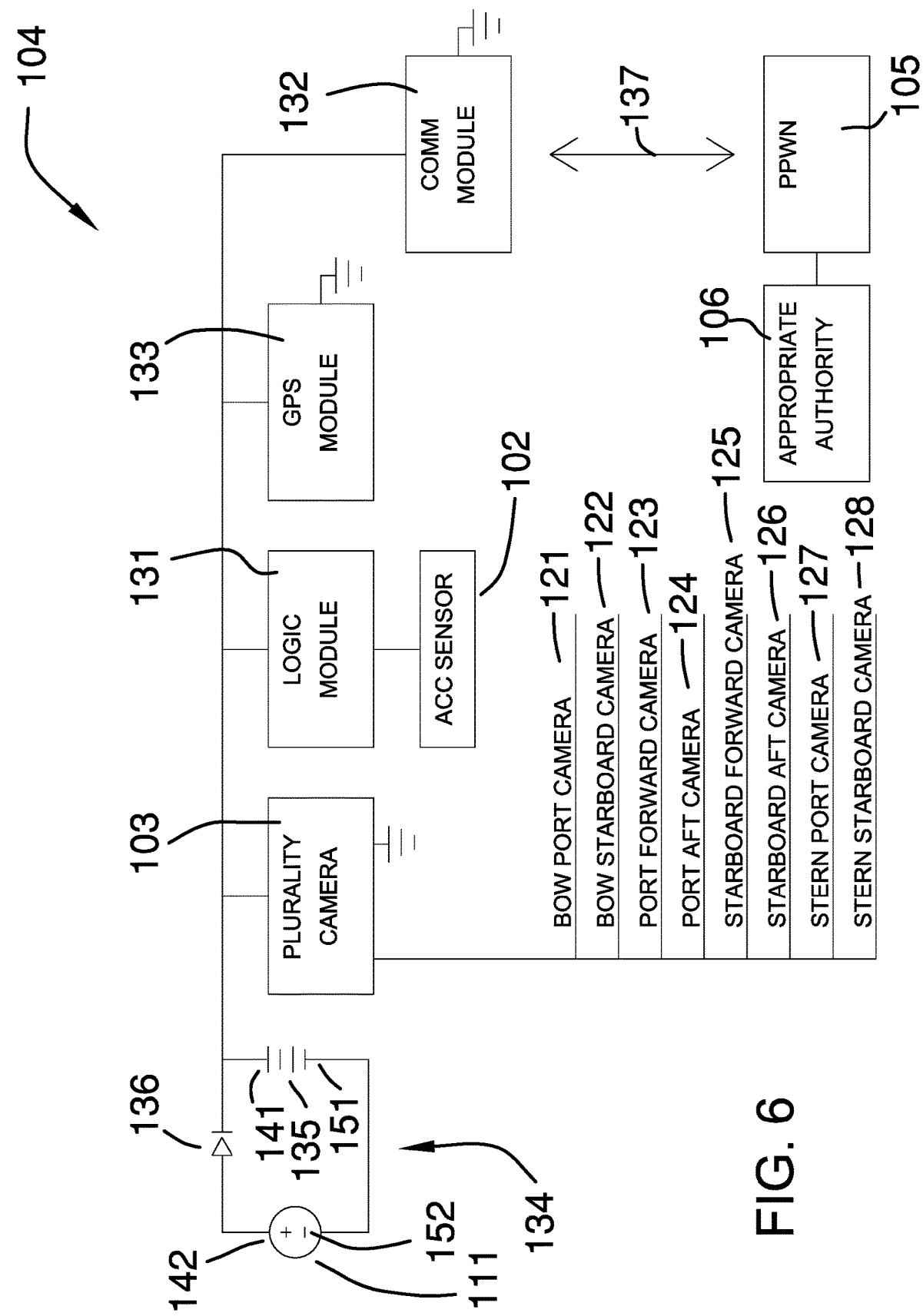
FIG. 6 is a block diagram of an embodiment of the disclosure.

Detailed reference will now be made to one or more potential embodiments of the disclosure, which are illustrated in FIGS. 1 through 6.

The vehicle accident recording system 100 (hereinafter invention) is a video recording device. The invention 100 is configured for use with a vehicle 101. The vehicle 101 further comprises a vehicle 101 electric power source 111. The invention 100: a) continuously captures video images of the area around the vehicle 101; b) converts the captured images into a video file; c) monitors the vehicle 101 for a deceleration event that is consistent with an unfortunate incident associated with the vehicle 101; and, d) in the event that an unfortunate incident is detected, the invention 100 automatically transmits the video file to an appropriate authority 106. The invention 100 is isolated from the vehicle 101 electric power source 111 such that invention 100 continues to operate in the event that the vehicle 101 electric power source 111 fails during the unfortunate incident. By continuing to operate is meant that the invention 100: a) continues to detect the deceleration event; and b) the invention 100 automatically continues to transmit the video file to an appropriate authority 106.

The commercially provided and publicly available cellular wireless network 105 is defined elsewhere in this disclosure. The appropriate authority 106 is defined elsewhere in this disclosure.

The invention 100 comprises an acceleration sensor 102, a plurality of cameras 103, a control circuit 104, and a commercially provided and publicly available cellular wireless network 105. The acceleration sensor 102 detects the deceleration event. The plurality of cameras 103 continuously captures video images of the area around the vehicle 101. The control circuit 104 controls the operation of the invention 100. The commercially provided and publicly available cellular wireless network 105 provides a communication link between the invention 100 and the appropriate authority 106.

The vehicle 101 is defined elsewhere in this disclosure. The vehicle 101 comprises a vehicle 101 electric power source 111, a bow 161, a port side 162, a starboard side 163, and a stern 164.

The vehicle 101 electric power source 111 is a source of electrical power that is provisioned through the vehicle 101. The vehicle 101 electric power source 111 is further defined with a second positive terminal 142 and a second negative terminal 152.

The bow 161 is defined elsewhere in this disclosure. The port side 162 refers to a vertically oriented side of the vehicle 101. The term port is defined elsewhere in this disclosure. The starboard side 163 refers to a vertically oriented side of the vehicle 101. The term starboard is defined elsewhere in this disclosure. The stern 164 is defined elsewhere in this disclosure.

The acceleration sensor 102 is an electrical device. The acceleration sensor 102 electrically connects to the control circuit 104. The acceleration sensor 102 detects the rate of change of the velocity of the vehicle 101. The acceleration sensor 102 is contained within the invention 100 and operates independently of the operation of the vehicle 101. By independent is meant that the acceleration sensor 102 does not require an electric connection to the vehicle 101 to operate properly during an unfortunate incident.

When the acceleration sensor 102 detects a rapid deceleration of the vehicle 101, the acceleration sensor 102 alerts the control circuit 104 to transmit the video files accumulated from the capture of images through the plurality of cameras 103 to the appropriate authority 106 using the commercially provided and publicly available cellular wireless network 105.

Each of the plurality of cameras 103 is an image sensor. The use of a camera as an image sensor is well-known and documented in the electrical arts. Each of the plurality of cameras 103 is configured for use with the control circuit 104. The control circuit 104 is further defined with a memory device. Each of the plurality of cameras 103 electrically connects to the control circuit 104. Each of the plurality of cameras 103 receives light from the exterior of the selected camera and converts the received light into a digital representation of sufficient detail to allow the control circuit 104 to create a video file of a visual reproduction of the source of the captured light. The control circuit 104 stores each video file accumulated by the capture of images through the plurality of cameras 103 until the accumulated video files are transmitted to the appropriate authority 106.

The plurality of cameras 103 comprises a bow 161 port camera 121, a bow 161 starboard camera 122, a port side 162 forward camera 123, a port side 162 aft camera 124, a starboard side 163 forward camera 125, a starboard side 163 aft camera 126, a stern 164 port camera 127, and a stern 164 starboard camera 128.

The bow 161 port camera 121 is an image sensor. The bow 161 port camera 121 mounts on the port half of the bow 161 of the vehicle 101 such that the bow 161 port camera 121 is positioned to capture images from the areas proximal to the vehicle 101 that are forward and port of the vehicle 101. The bow 161 starboard camera 122 is an image sensor. The bow 161 starboard camera 122 mounts on the starboard half of the bow 161 of the vehicle 101 such that the bow 161 starboard camera 122 is positioned to capture images from the areas proximal to the vehicle 101 that are forward and starboard of the vehicle 101.

The port side 162 forward camera 123 is an image sensor. The port side 162 forward camera 123 mounts on the port side 162 of the vehicle 101 such that the port side 162 forward camera 123 is positioned to capture images from the areas proximal to the vehicle 101 that are forward and port of the vehicle 101. The port side 162 aft camera 124 is an image sensor. The port side 162 aft camera 124 mounts on the port side 162 of the vehicle 101 such that the port side 162 aft camera 124 is positioned to capture images from the areas proximal to the vehicle 101 that are aft and port of the vehicle 101.

The starboard side 163 forward camera 125 is an image sensor. The starboard side 163 forward camera 125 mounts on the starboard side 163 of the vehicle 101 such that the starboard side 163 forward camera 125 is positioned to capture images from the areas proximal to the vehicle 101 that are forward and starboard of the vehicle 101. The starboard side 163 aft camera 126 is an image sensor. The starboard side 163 aft camera 126 mounts on the starboard side 163 of the vehicle 101 such that the starboard side 163 aft camera 126 is positioned to capture images from the areas proximal to the vehicle 101 that are aft and starboard of the vehicle 101.

The stern 164 port camera 127 is an image sensor. The stern 164 port camera 127 mounts on the port half of the stern 164 of the vehicle 101 such that the stern 164 port camera 127 is positioned to capture images from the areas proximal to the vehicle 101 that are aft and port of the vehicle 101. The stern 164 starboard camera 128 is an image sensor. The stern 164 starboard camera 128 mounts on the starboard half of the stern 164 of the vehicle 101 such that the stern 164 starboard camera 128 is positioned to capture images from the areas proximal to the vehicle 101 that are aft and starboard of the vehicle 101.

The control circuit 104 is an electrical circuit. The control circuit 104 controls the operation of the invention 100. The control circuit 104 monitors the acceleration sensor 102 for a deceleration consistent with an unfortunate incident. The control circuit 104 receives electrical signals generated by each of the plurality of cameras 103. The control circuit 104 converts the electrical signals received from the plurality of cameras 103 into one or more video files. The control circuit 104 stores the accumulated one or more video files in a memory device. Upon detection of a deceleration event consistent with an unfortunate incident, the control circuit 104 transmits the video files accumulated from the capture of images through the plurality of cameras 103 to the appropriate authority 106 through the commercially provided and publicly available cellular wireless network 105.

The control circuit 104 comprises a logic module 131, a communication module 132, a GPS module 133, and a power circuit 134. The logic module 131, the communication module 132, the GPS module 133, and the power circuit 134 are electrically interconnected.

The logic module 131 is a readily and commercially available programmable electronic device that is used to manage, regulate, and operate the control circuit 104.

The bow 161 port camera 121 electrically connects to the logic module 131. The logic module 131 controls the operation of and receives electrically encoded images from the bow 161 port camera 121. The bow 161 starboard camera 122 electrically connects to the logic module 131. The logic module 131 controls the operation of and receives electrically encoded images from the bow 161 starboard camera 122.

The port side 162 forward camera 123 electrically connects to the logic module 131. The logic module 131 controls the operation of and receives electrically encoded images from the port side 162 forward camera 123. The port side 162 aft camera 124 electrically connects to the logic module 131. The logic module 131 controls the operation of and receives electrically encoded images from the port side 162 aft camera 124.

The starboard side 163 forward camera 125 electrically connects to the logic module 131. The logic module 131 controls the operation of and receives electrically encoded images from the starboard side 163 forward camera 125. The starboard side 163 aft camera 126 electrically connects to the logic module 131. The logic module 131 controls the operation of and receives electrically encoded images from the starboard side 163 aft camera 126.

The stern 164 port camera 127 electrically connects to the logic module 131. The logic module 131 controls the operation of and receives electrically encoded images from the stern 164 port camera 127. The stern 164 starboard camera 128 electrically connects to the logic module 131. The logic module 131 controls the operation of and receives electrically encoded images from the stern 164 starboard camera 128.

The communication module 132 is a wireless electronic communication device that allows the logic module 131 to wirelessly communicate with a commercially provided and publicly available cellular wireless network 105. Specifically, the communication module 132 establishes a wireless communication link 137 between the control circuit 104 and the commercially provided and publicly available cellular wireless network 105.

The communication module 132 communicates MMS messages between the logic module 131 and the appropriate authority 106 through a commercially provided and publicly available cellular wireless network 105. The MMS messages contain: a) the video files accumulated from the capture of images through the plurality of cameras 103; and, b) the GPS coordinates of the GPS module 133 of the control circuit 104. The use of a commercially provided and publicly available cellular wireless network 105 is preferred because: 1) of its low cost; 2) of the widespread availability and the broad interoperability between competing commercially provided and publicly available cellular wireless networks 105; and, 3) methods and techniques to send SMS and MMS messages over a commercially provided and publicly available cellular wireless network 105 are well known and documented by those skilled in the electrical arts.

The GPS module 133 is an electrical device that communicates with the GPS to determine the GPS coordinates of the GPS module 133. When queried by the logic module 131, the GPS module 133 transfers the GPS coordinates to the logic module 131.

The power circuit 134 is an electrical circuit. The power circuit 134 stores electrical energy drawn from the vehicle 101 electric power source 111 as chemical potential energy. The power circuit 134 converts the chemical potential energy back into the electrical energy required to operate acceleration sensor 102, the plurality of cameras 103, the logic module 131, the communication module 132, and the GPS module 133. The power circuit 134 further comprises a battery 135 and a diode 136. The battery 135 is further defined with a first positive terminal 141 and a first negative terminal 151.

The battery 135 is a commercially available rechargeable battery 135. The chemical energy stored within the rechargeable battery 135 is renewed and restored through the use of the vehicle 101 electric power source 111. The vehicle 101 electric power source 111 is an electrical circuit that reverses the polarity of the rechargeable battery 135 and provides the energy necessary to reverse the chemical processes that the rechargeable battery 135 initially used to generate the electrical energy. This reversal of the chemical process creates a chemical potential energy that will later be used by the rechargeable battery 135 to generate electricity. The diode 136 is an electrical device that allows current to flow in only one direction. The diode 136 installs between the rechargeable battery 135 and the vehicle 101 electric power source 111 such that electricity will not flow from the first positive terminal 141 of the rechargeable battery 135 into the second positive terminal 142 of the vehicle 101 electric power source 111.

The following definitions were used in this disclosure:

Aft: As used in this disclosure, aft is a term that relates a first object to a second object. When the second object is closer to the stern of a vehicle, the second object is said to be aft of the first object. The term is commonly used on vessels and vehicles.

Anterior: As used in this disclosure, anterior is a term that is used to refer to the front side or direction of a structure. When comparing two objects, the anterior object is the object that is closer to the front of the structure.

Appropriate Authority: As used in this disclosure, an appropriate authority is a previously determined person or organization that is designated to send and receive alarm or other notification messages regarding a monitored system or activity.

Battery: As used in this disclosure, a battery is a chemical device consisting of one or more cells, in which chemical energy is converted into electricity and used as a source of power. Batteries are commonly defined with a positive terminal and a negative terminal.

Bow: As used in this disclosure, the bow refers to the anterior side of an object, vehicle, or vessel. Specifically, the bow refers to the most forward element of the object in the direction of the primary sense of direction of the object, vehicle, or vessel.

Camera: As used in this disclosure, a camera is a sensor that converts light into electric signals that encode and records the spatial orientation of the captured light in a manner that reproduces the images seen by a human eye.

Commercially Provided And Publicly Available Cellular Wireless Network: As used in this disclosure, a commercially provided and publicly available cellular wireless network refers to subscription-based publically available wireless network commonly used to provide wireless communication access for personal data devices. The commercially provided and publicly available cellular wireless network will typically provide voice communication, data communication services, and SMS and MMS messaging services. The commercially provided and publicly available cellular wireless network is commonly referred to as the cellular network. The commercially provided and publicly available cellular wireless network is abbreviated as the PPWN.

Communication Link: As used in this disclosure, a communication link refers to the structured exchange of data between two objects.

Diode: As used in this disclosure, a diode is a two terminal semiconductor device that allows current flow in only one direction. The two terminals are called the anode and the cathode. Electric current is allowed to pass from the anode to the cathode.

External Power Source: As used in this disclosure, an external power source is a source of the energy that is externally provided to enable the operation of the present disclosure. Examples of external power sources include, but are not limited to, electrical power sources and compressed air sources.

Force of Gravity: As used in this disclosure, the force of gravity refers to a vector that indicates the direction of the pull of gravity on an object at or near the surface of the earth.

Forward: As used in this disclosure, forward is a term that relates a first object to a second object. When the first object is closer to the bow of a vehicle, the first object is said to be forward of the second object. The term is commonly used on vessels and vehicles. See bow, aft, port, starboard, and stern GPS: As used in this disclosure, and depending on the context, GPS refers to: 1) a system of navigational satellites that are used to determine the position, known as GPS coordinates, and velocity of a person or object; 2) the system of navigational satellites referred to in the first definition that are used to synchronize to global time; or, 3) an electronic device or that uses the system of navigational satellites referred to in the first definition to determine the position of a person or object. GPS is an acronym for Global Positioning System. Methods to determine the distance and direction between any two sets of GPS coordinates are well-known and documented in the navigational arts.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Image: As used in this disclosure, an image is an optical representation or reproduction of an indicia or of the appearance of something or someone.

Image Sensor: As used in this disclosure, an image sensor receives light from the exterior of the image sensor and converts the received light into a digital representation of sufficient detail to allow a logic module to create and display a visual reproduction of the source of the captured light.

Inferior: As used in this disclosure, the term inferior refers to a directional reference that is parallel to and in the same direction as the force of gravity when an object is positioned or used normally.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior-posterior axis. Lateral movement is often called sideways movement.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Memory Device: As used in this device, a memory device is an electronic device that stores information (including audio and video data) in a digital format. Common memory devices include the RAM (random access memory) and disk drives in a computer, USB (Universal Serial Bus) drives, DVD (Digital Video Disk) formatted video, and SD (secure digital) cards.

Port: As used in this disclosure, port refers to the left side of a vehicle when a viewer is facing towards the primary sense of direction of the vehicle.

Posterior: As used in this disclosure, posterior is a term that is used to refer to the side of an object that is distal or in the opposite direction of the anterior side. When comparing two items, the posterior item is the item that is distal from the anterior of the object.

PPWN: As used in this disclosure, the PPWN is an acronym for a publically provided wireless network. The PPWN refers to a commercially provided and publicly available cellular wireless network.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Sensor: As used in this disclosure, a sensor is a device that receives and responds in a predetermined way to a signal or stimulus. As further used in this disclosure, a threshold sensor is a sensor that generates a signal that indicates whether the signal or stimulus is above or below a given threshold for the signal or stimulus.

SMS: As used in this disclosure, SMS is an abbreviation for short message service. The short message service is a service that is often provided with the cellular services that support personal data devices. Specifically, the SMS allows for the exchange of written messages between personal data devices. The SMS is commonly referred to as text messaging. A common enhancement of SMS is the inclusion of the delivery of multimedia services. This enhanced service is often referred to as Multimedia Media Services, which is abbreviated as MMS.

Starboard: As used in this disclosure, starboard refers to the right side of a vehicle when a viewer is facing towards the primary sense of direction of the vehicle.

Stern: As used in this disclosure, the stern refers to the posterior side of an object, vehicle, or vessel. The stern is distal from the bow along the primary sense of direction.

Superior: As used in this disclosure, the term superior refers to a directional reference that is parallel to and in the opposite direction of the force of gravity when an object is positioned or used normally.

Unfortunate Incident: As used in this disclosure, an unfortunate incident is an incident that: 1) happens unexpectedly; 2) happens unintentionally; and, 3) has the potential to cause injury and or property damage.

Vehicle: As used in this disclosure, a vehicle is a motorized device that is used for transporting passengers, goods, or equipment. The term motorized vehicle refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Video: As used in this disclosure, video refers to the display of: a) an image; or, b) a plurality of images in a manner that simulates the perception of motion for a person viewing the video. This disclosure assumes that a video device can further incorporate sounds associated with the generated images.

Video Device: As used in this disclosure, a video device is a device that generates an image on a display. The image may be a still or moving image.

Video File: As used in this disclosure, a video file is a digital representation of an image and associated audible sounds to store an image. Separate hardware is used to convert the digital representation of the sound into an audible sound.

Video Source: As used in this disclosure, a video source is a device that generates electrical signals that can be converted into an image by a display.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A video recording device comprising
an acceleration sensor, a plurality of cameras, a control circuit, and a commercially provided and publicly available cellular wireless network;
wherein the plurality of cameras are adapted to continuously capture video images of an area around a vehicle;
wherein the control circuit controls the operation of the video recording device;
wherein the commercially provided and publicly available cellular wireless network provides a communication link between the video recording device and an appropriate authority;
wherein the video recording device is configured for use with said vehicle;
wherein the acceleration sensor is adapted to detect a deceleration event of said vehicle;
wherein the video recording device continuously captures video images of the area around the vehicle;
wherein the video recording device converts the captured images into one or more video files;
wherein the video recording device transmits the one or more video files to the appropriate authority;
wherein the video recording device is isolated from the vehicle electric power source such that the video recording device continues to operate in the event that the vehicle electric power source fails during the deceleration event;
wherein by continuing to operate is meant that the video recording device: a) continues to detect the deceleration event; and b) the video recording device automatically continues to transmit the one or more video files to the appropriate authority;
wherein the vehicle comprises a vehicle electric power source, a bow, a port side, a starboard side, and a stern;
wherein the vehicle electric power source is a source of electrical power;
wherein the vehicle electric power source is further defined with a second positive terminal and a second negative terminal;
wherein the plurality of cameras comprises a bow port camera, a bow starboard camera, a port side forward camera, a port side aft camera, a starboard side forward camera, a starboard side aft camera, a stern port camera, and a stern starboard camera;
wherein the bow port camera mounts on the port half of the bow of the vehicle;
wherein the bow starboard camera mounts on the starboard half of the bow of the vehicle;
wherein the port side forward camera mounts on the port side of the vehicle;
wherein the port side aft camera mounts on the port side of the vehicle;
wherein the starboard side forward camera mounts on the starboard side of the vehicle;
wherein the starboard side aft camera mounts on the starboard side of the vehicle;
wherein the stern port camera mounts on the port half of the stern of the vehicle;
wherein the stern starboard camera mounts on the starboard half of the stern of the vehicle.

2. The video recording device according to claim 1
wherein the control circuit is an electrical circuit;
wherein the control circuit controls the operation of the video recording device;
wherein the control circuit monitors the acceleration sensor for deceleration event;
wherein the control circuit receives electrical signals generated by each of the plurality of cameras;
wherein the control circuit converts the electrical signals received from the plurality of cameras into the one or more video files;
wherein the control circuit stores the accumulated one or more video files in a memory device.

3. The video recording device according to claim 2 wherein upon detection of a deceleration event, the control circuit transmits the one or more video files accumulated from the capture of images through the plurality of cameras to the appropriate authority through the commercially provided and publicly available cellular wireless network.

4. The video recording device according to claim 3
wherein the acceleration sensor is an electrical device;
wherein the acceleration sensor electrically connects to the control circuit;
wherein the acceleration sensor detects the rate of change of the velocity of the vehicle;
wherein the acceleration sensor is contained within the video recording device;
wherein acceleration sensor does not require an electric connection to the vehicle to operate.

5. The video recording device according to claim 4 wherein when the acceleration sensor detects the deceleration event, the acceleration sensor alerts the control circuit to transmit the one or more video files to the appropriate authority using the commercially provided and publicly available cellular wireless network.

6. The video recording device according to claim 5
wherein each of the plurality of cameras is an image sensor;
wherein each of the plurality of cameras electrically connects to the control circuit.

7. The video recording device according to claim 6
wherein each of the plurality of cameras receives light from the exterior of the selected camera and converts the received light into a digital representation of sufficient detail to allow the control circuit to create a video file of a visual reproduction of the source of the captured light;
wherein the control circuit stores each video file accumulated by the capture of images through the plurality of cameras until the accumulated video files are transmitted to the appropriate authority.

8. The video recording device according to claim 7
wherein the bow port camera is positioned to capture images from the areas proximal to the vehicle that are forward and port of the vehicle;
wherein the bow starboard camera is positioned to capture images from the areas proximal to the vehicle that are forward and starboard of the vehicle;
wherein the port side forward camera is positioned to capture images from the areas proximal to the vehicle that are forward and port of the vehicle;
wherein the port side aft camera is positioned to capture images from the areas proximal to the vehicle that are aft and port of the vehicle;
wherein the starboard side forward camera is positioned to capture images from the areas proximal to the vehicle that are forward and starboard of the vehicle;
wherein the starboard side aft camera is positioned to capture images from the areas proximal to the vehicle that are aft and starboard of the vehicle;
wherein the stern port camera is positioned to capture images from the areas proximal to the vehicle that are aft and port of the vehicle;
wherein the stern starboard camera is positioned to capture images from the areas proximal to the vehicle that are aft and starboard of the vehicle.

9. The video recording device according to claim 8
wherein the control circuit comprises a logic module, a communication module, a GPS module, and a power circuit;
wherein the logic module, the communication module, the GPS module, and the power circuit are electrically interconnected.

10. The video recording device according to claim 9 wherein the logic module is a programmable electronic device.

11. The video recording device according to claim 10
wherein the communication module is a wireless electronic communication device;
wherein the communication module establishes a wireless communication link between the control circuit and the commercially provided and publicly available cellular wireless network;
wherein the communication module allows the logic module to wirelessly communicate with the commercially provided and publicly available cellular wireless network;
wherein the communication module communicates MMS messages between the logic module and the appropriate authority through a commercially provided and publicly available cellular wireless network.

12. The video recording device according to claim 11
wherein the GPS module is an electrical device;
wherein the GPS module communicates with the GPS to determine the GPS coordinates of the GPS module;
wherein the GPS module transfers the GPS coordinates to the logic module.

13. The video recording device according to claim 12 wherein the MMS messages contain: a) the video files accumulated from the capture of images through the plurality of cameras; and, b) a set of GPS coordinates of the GPS module of the control circuit.

14. The video recording device according to claim 13
wherein the power circuit is an electrical circuit;
wherein the power circuit further comprises a battery and a diode;
wherein the battery is further defined with a first positive terminal and a first negative terminal;
wherein the vehicle electric power source is an electrical circuit that reverses the polarity of the battery.

15. The video recording device according to claim 14
wherein the bow port camera electrically connects to the logic module;
wherein the bow starboard camera electrically connects to the logic module;
wherein the port side forward camera electrically connects to the logic module;
wherein the port side aft camera electrically connects to the logic module;
wherein the starboard side forward camera electrically connects to the logic module;
wherein the starboard side aft camera electrically connects to the logic module;
wherein the stern port camera electrically connects to the logic module;
wherein the stern starboard camera electrically connects to the logic module.

16. The video recording device according to claim 15
wherein the logic module controls the operation of and receives electrically encoded images from the bow port camera;
wherein the logic module controls the operation of and receives electrically encoded images from the bow starboard camera;
wherein the logic module controls the operation of and receives electrically encoded images from the port side forward camera;

wherein the logic module controls the operation of and receives electrically encoded images from the port side aft camera;

wherein the logic module controls the operation of and receives electrically encoded images from the starboard side forward camera;

wherein the logic module controls the operation of and receives electrically encoded images from the starboard side aft camera;

wherein the logic module controls the operation of and receives electrically encoded images from the stern port camera;

wherein the logic module controls the operation of and receives electrically encoded images from the stern starboard camera.

17. The video recording device according to claim 16 wherein the power circuit further comprises a diode;

wherein the diode is an electrical device that allows current to flow in only one direction;

wherein the diode installs between the battery and the vehicle electric power source such that electricity will not flow from the first positive terminal of the battery into the second positive terminal of the vehicle electric power source.

* * * * *